(12) United States Patent
Pell et al.

(10) Patent No.: US 9,367,658 B2
(45) Date of Patent: Jun. 14, 2016

(54) METHOD AND APPARATUS FOR DESIGNING AND GENERATING A STREAM PROCESSOR

(75) Inventors: Oliver Pell, London (GB); James Huggett, London (GB)

(73) Assignee: Maxeler Technologies Ltd., London (GB)

(*) Notice: Subject to any disclaimer, the term of this patent is extended or adjusted under 35 U.S.C. 154(b) by 31 days.

(21) Appl. No.: 13/166,565

(22) Filed: Jun. 22, 2011

(65) Prior Publication Data

US 2012/0330638 A1    Dec. 27, 2012

(51) Int. Cl.
*G06F 9/44* (2006.01)
*G06F 17/50* (2006.01)

(52) U.S. Cl.
CPC .......... *G06F 17/505* (2013.01); *G06F 2217/68* (2013.01)

(58) Field of Classification Search
None
See application file for complete search history.

(56) References Cited

U.S. PATENT DOCUMENTS

| 5,317,734 | A  | * | 5/1994  | Gupta            | 717/161 |
| 6,009,262 | A  | * | 12/1999 | Uematsu          | 703/27  |
| 7,305,649 | B2 | * | 12/2007 | Bellas et al.    | 716/102 |
| 7,590,644 | B2 | * | 9/2009  | Matsakis et al.  |         |
| 2003/0056205 | A1 | * | 3/2003 | Miloushev et al. | 717/162 |
| 2011/0145447 | A1 |   | 6/2011 | Dimond           |         |
| 2012/0200315 | A1 | * | 8/2012 | Dimond           | 326/39  |
| 2012/0216019 | A1 | * | 8/2012 | Bower et al.     | 712/201 |

OTHER PUBLICATIONS

"A Java-based System for FPGA Programming". FPGAworld Conference, Stockholm, Sweden. Academic Proceedings 2008.*

* cited by examiner

*Primary Examiner* — Omar Fernandez Rivas
*Assistant Examiner* — Nithya J Moll
(74) *Attorney, Agent, or Firm* — Conley Rose, P.C.

(57) ABSTRACT

Embodiments of the invention provide a method and apparatus for generating programmable logic for a hardware accelerator, the method comprising: generating a graph of nodes representing the programmable logic to be implemented in hardware; identifying nodes within the graph that affect external flow control of the programmable logic; retaining the identified nodes and removing or replacing all nodes which do not affect external flow control of the programmable logic in a modified graph; and simulating the modified graph or building a corresponding circuit of the retained nodes.

6 Claims, 6 Drawing Sheets

METHOD AND APPARATUS FOR DESIGNING AND GENERATING A STREAM PROCESSOR

STATEMENT REGARDING FEDERALLY SPONSORED RESEARCH OR DEVELOPMENT

Not applicable.

BACKGROUND

1. Field of the Invention

Embodiments of the invention relate generally to a method and apparatus for designing and generating a stream processor such as a hardware accelerator.

2. Background of Technology

Typically, a stream processor such as a hardware accelerator such as might be provided by the assignee, Maxeler Technologies Ltd., consists of a Field Programmable Gate Array (FPGA), connected to multiple memories or other external data sources/sinks, as shown in FIG. 1. On the FPGA, the circuit is made up of a manager containing one or more blocks including kernels.

Kernels are hardware data-paths implementing the arithmetic and logical computations needed within an algorithm. A "manager" is the collective term for the FPGA logic which orchestrates or controls data flow between Kernels and off-chip input/output (I/O) in the form of streams. By using a streaming model for off-chip I/O to the associated external components, e.g. PCI Express bus, MaxRing and DRAM memory, managers are able to achieve high utilization of available bandwidth in off-chip communication channels. A user, when designing or configuring an FPGA, controls the designs of the kernels and the configuration of the manager so as to ensure that the FPGA performs the desired processing steps on data passing through it.

Typically dataflow hardware accelerators implement a streaming model of computation in which computations are described structurally (computing in space) rather than specifying a sequence of processor instructions (computing in time). In this model of computation, a high-level language is used to generate a graph of operations. Each node in the graph executes a specific function on incoming data and outputs the result, which becomes the input to another node in the graph. The data being processed "flows" through the graph from one node to the next, without requiring writing back to memory. This graph may then be implemented as an application-specific circuit within an FPGA accelerator.

Kernels are typically statically scheduled by a compiler at build time. This means that the dataflow through a kernel is precisely orchestrated on each clock cycle. In contrast, managers are dynamically scheduled, meaning that events occur in an irregular manner and data is passed to and from the statically scheduled units. The combined system as typically provided on an accelerator chip, e.g. an FPGA, together with the driving software, is therefore a dynamic system.

Streaming accelerators implemented using FPGAs or other similar processing technology, can offer increased performance on many useful applications compared to conventional microprocessors. See for example our co-pending applications, U.S. application Ser. Nos. 12/636,906, 12/792, 197, 12/823,432, 13/023,275 and 13/029,696, the entire contents of all of which are hereby incorporated by reference for all purposes.

The implementation of a streaming processor can be understood as being made up of a data path, representing the computation performed on data as it flows through the streaming circuit and a control path representing decision making within the circuit, for example over what data should be output.

The correctness of the control flow of a streaming processor may depend entirely on the correctness of the control path. Control path errors could lead to a streaming accelerator producing an incorrect amount of output, or deadlock occurring, regardless of whether the data values are correct (which is dependent on the data path).

In compiling a chip design, it is possible for a variety of flow control errors to occur. For example, any or all of the following errors can typically occur:

1. The chip may fail to consume the required amount of input data. This could cause the external data source to fail to send the amount of data expected into the system and stall as a result.
2. The chip may try to consume too much input data. Since data is not available, the chip will starve and stop running
3. The chip may not produce enough output data, in which case a read-from-chip operation will starve.
4. On the chip, the scheduling of data inputs and outputs may be such that the internal buffering in the manager is not sufficient to "smooth out" the transfers and the chip will deadlock.

Flow control errors can therefore be particularly serious as they can cause a chip to crash or deadlock. These are standard issues in parallel programming, whether in hardware or software. During the process of generating an FPGA design these problems are sorted out by "debugging" so as to ensure that the hardware design finally arrived at, does not suffer from these flow control problems.

BRIEF SUMMARY OF EMBODIMENTS

According to a first aspect of an embodiment of the invention, there is provided a method of generating a stream processor, the method comprising: generating a graph of nodes representing the stream processor to be implemented in hardware; identifying nodes within the graph that affect external flow control of the stream processor; retaining the identified nodes and removing or replacing all nodes which do not affect external flow control of the stream processor in a modified graph; and simulating the modified graph or building a corresponding circuit of the retained nodes.

Some embodiments of the invention provide a method in which a modified graph is generated in which nodes relating purely to data flow are removed. This therefore enables the control path to be debugged separately from the data path in an FPGA or other such streaming hardware processor. The method is advantageous as it is beneficial to be able to debug the control path of a stream processor separately to the data path, since the control path is typically much smaller than the data path. In most representations of a streaming accelerator, such as a description in a hardware description language such as VHDL, control and data path descriptions are intermingled and difficult to separate. Some embodiments of the invention provides a simple and robust method by which the control path can easily be isolated such as to enable the separate debugging thereof.

When built into a circuit such as an FPGA, circuits that do not contain the data path can therefore be compiled quicker, leading to shorter modify-build-test debug cycles and less overall debugging time. Indeed, the method enables the elements of a combined control/data path that do not affect the control path to be automatically removed, meaning that a single input description containing both control and data flow can be used to build either the full control and data path or the control path in isolation.

In one example, the method comprises automatically generating the graph of nodes from a high level description of the stream processor to be implemented.

In one example, the method comprises traversing the graph in reverse order from outputs to inputs and, for each node, determining in sequence if it affects external flow control.

In one example, the determination as to whether or not the node affects external flow control includes identifying it if it is a control signal (read/write) to an externally visible input or output.

In one example, the method comprises categorising each node into a class selected from the following: a. data path nodes comprising the processing to be performed on data streaming through the stream processor; b. control path nodes comprising nodes that affect control within the graph; and c. control path nodes that affect external flow to or from the graph.

In one example, nodes in classes a and b are removed from the graph.

In one example, the method comprises once the graph has been simulated or a corresponding circuit built of the nodes that do affect external flow control, debugging any identified flow control bugs independent of the data flow through the stream processor.

In one example, the programmable logic is an FPGA.

According to a second aspect of an embodiment of the invention, there is provided a computer system comprising a processor and memory and a stream processor, e.g. a hardware accelerator, made according to the method of the first aspect of the invention.

BRIEF DESCRIPTION OF DRAWINGS

Embodiments of the invention will now be described in detail with reference to the accompanying drawings, in which.

DETAILED DESCRIPTION OF EMBODIMENTS OF THE INVENTION

Figure 1:
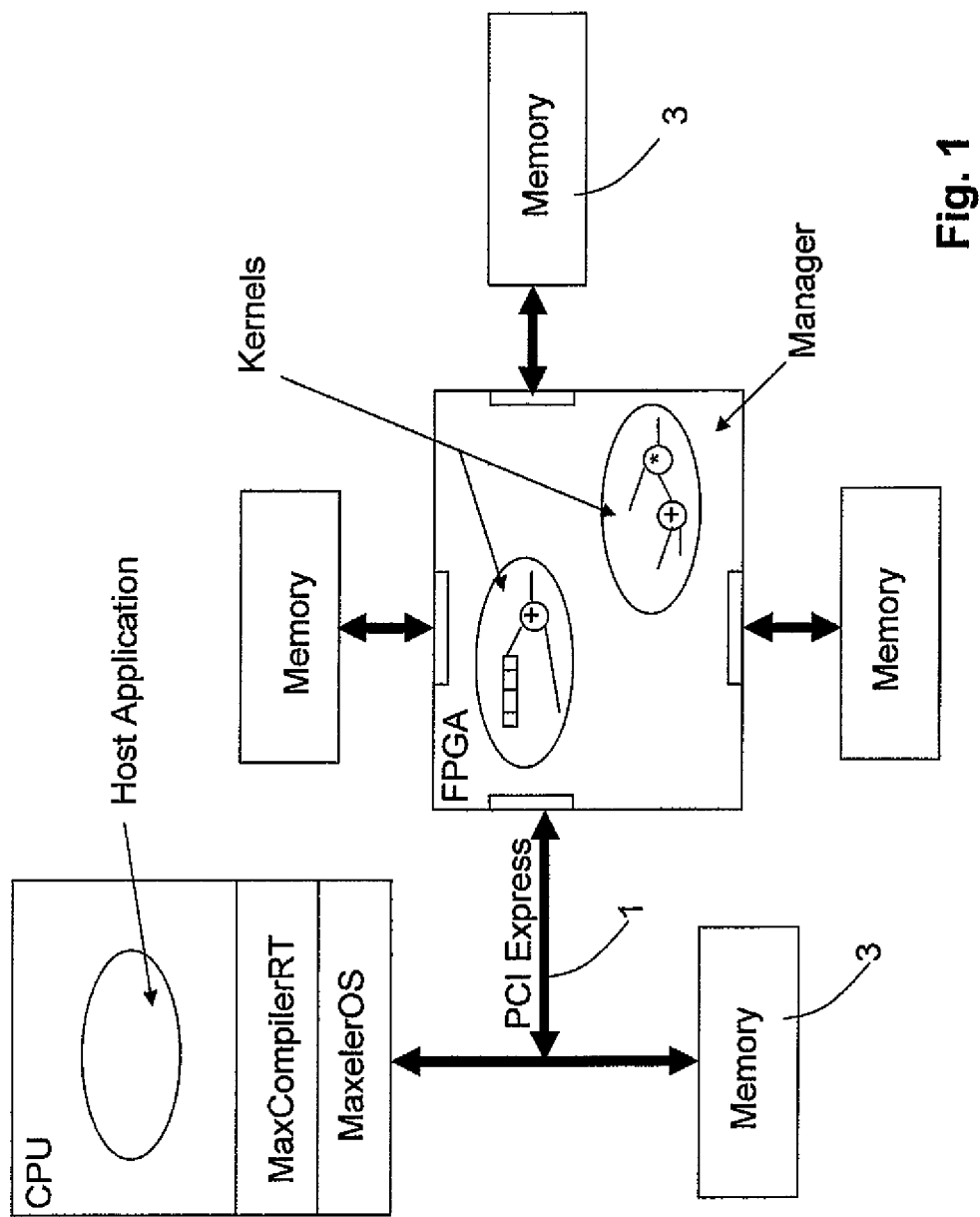
FIG. 1 is a schematic representation of the architecture of a stream processor, as might be implemented using an FPGA.

FIG. 1 is a schematic representation of the architecture of a stream processor, as might be implemented using programmable logic such as an FPGA. As can be seen, and as described above, the accelerator 1 comprises a number of kernels arranged to execute specific operations on streaming data. A manager is provided to orchestrate or control data flow between kernels and off-chip input/output (I/O). In the example shown, the accelerator is connected to a host application via a PCI express bus 1. Memory 3 is provided connected to the accelerator and the host processor. It will be appreciated that the precise configuration of memories is typically application specific. FIG. 1 is merely exemplary.

Figure 2:
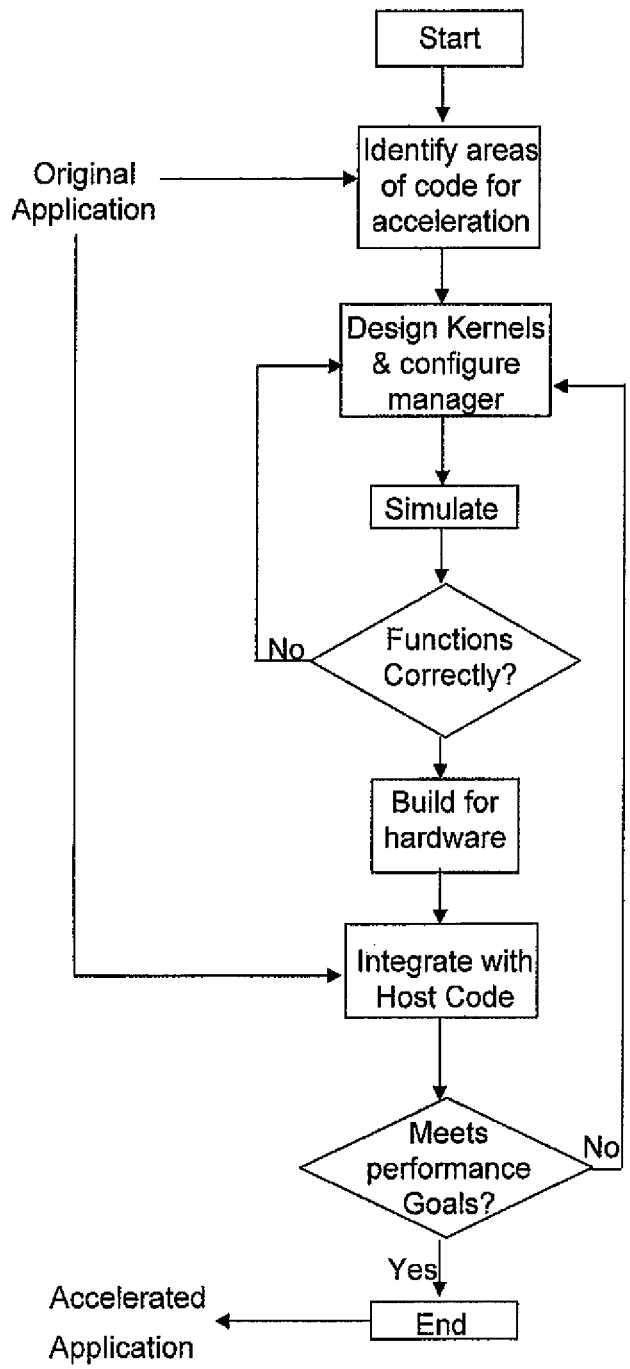
FIG. 2 is a schematic flow chart showing the development process for a hardware accelerator.

So as to understand the present process by which design and configuration of a stream processor and/or an accelerator can be simplified and made more efficient, a known development process for a hardware accelerator for some process as defined by code will first be described. Referring to FIG. 2, at step 2 application source code, i.e. the text written in a computer programming language by a human programmer, is analysed by the programmer to determine which parts of the code should be accelerated. In general, it is desirable to select a small proportion of a software application for acceleration. The remainder of the code can execute on the host CPU. Selecting the optimal components to accelerate can be involved, but typically should take into account the aim of maximizing run-time coverage. The selection is not key to the present method.

In other words, the selected components should represent the majority of the application run-time. Speedup is limited by the portion of the runtime that remains non-accelerated, so that if 99% of an algorithm embodied in software is accelerated, the maximum possible speedup is 100×. In a typical application most of the execution time is spent in a small proportion of the code, and this area of the code can be identified using widely available profiling tools such as GNU gprof, LINUX oprofile, valgrind etc.

Selection preferably also takes into account maximizing the regularity of computation. It is known that FPGAs operate best when performing the same operation repeatedly on many data items, for example, when computing an inner loop. Operations that are only performed on a small portion of the data may be best left on the CPU, since if accelerated they would consume resources that could be better used elsewhere.

It is also desirable to minimize communication between the host and the accelerator. Sending/receiving data between the host and the accelerator is, relatively speaking, expensive, since communication is usually slower than computation. By carefully selecting the parts of an application to accelerate, and if necessary transforming the program, it is often possible to optimize the data transfer requirements to/from the accelerator. For example, in some cases it may be appropriate to accelerate a part of the code that has only a small impact on run-time because it enables the amount of data transfer to be reduced (for example, a final accumulation over a data-set that is a tiny portion of an overall computation but reduces data volume by hundreds or thousands of times).

Once areas for acceleration have been identified, the required kernels for performing the acceleration are designed as indicated at step 4. In order to create Kernel designs, a known kernel compiler can be used. MaxCompiler includes the Maxeler Kernel Compiler, which is a high-level programming system for creating high-performance FPGA logic and arithmetic circuits. Using a high level language such as Java, it is possible to write complex and parameterizable Kernel Compiler designs which lead to highly-tuned application-specific FPGA configurations. The computationally intensive inner loops of many applications are highly regular and can easily be turned into streaming kernels.

The Maxeler Kernel Compiler itself is implemented as a Java library. In order to create a kernel design, a user writes Java programs which make calls to the Kernel Compiler application programming interface (API) to describe computation. Although computation is expressed by making calls to a library, arithmetic operations often read naturally as in a C or Fortran program as the Kernel Compiler API makes heavy use of operator overloading. The advantage of interfacing with the Kernel Compiler via a Java library is that the full programming power of Java can be leveraged to customize a design. For example, by using standard Java constructs such as if-statements and for-loops developers can carefully control exactly how a specific instance of a design is built up to make optimal use of FPGA resources.

Equally, different FPGA configurations can be built from a common kernel code-base optimized for different operating scenarios. Since the kernel design can be broken up into Java classes and procedures, MaxCompiler programs support extensive code reuse across different applications.

In addition at step 4, a manager is configured. Indeed, once kernels have been created, these are integrated into the FPGA and connected to data channels outside the FPGA by encapsulating them within a manager. Once the Java code for kernels and the configuration of a manager are combined they will form a complete Java program. The execution of this program will result in either the generation of an FPGA (.max) configuration file, or the execution of a hardware simulation.

Typically also within step 4, compiling is then performed. Due to the kernel compiler (and other elements of MaxCompiler) being accessed as a Java library there are preferably, though not essentially, several different stages of compilation:

Java Compilation
1. As the kernel compiler and the managers are implemented in Java, the first stage is Java compilation. In this stage the MaxCompiler Java compiler is used to compile user code with normal Java syntax checking etc. taking place.

Java Run-Time
2. The next stages of compilation take place at Java run-time i.e. the compiled Java code (in .class files) is executed. This process includes the further steps of:

(a) Graph construction: In this stage user code is executed and a graph of computation is constructed, e.g. in memory, based on the user calls to the Kernel Compiler API.

(b) Kernel Compiler compilation: After all the user code to describe a design has been executed the Kernel Compiler takes the generated graph, optimizes it and transforms it to be suitable for implementation in hardware. Such optimisation might involve scheduling and buffer allocation so as to ensure the required or desired synchronisation between kernels and processes and the like. As will be explained below, in the present method, the generated graph is then further processed so as to support a subsequent debugging process.

(c) The graph is converted into either a low-level format suitable for generating an FPGA circuit or a simulation model.

(d) Back-end compilation: For a hardware build, at this point third-party vendor tools are called automatically by MaxCompiler to further compile the design into an FPGA configuration file. For simulation, MaxCompiler will run the MaxCompilerSim compilation process to further compile the design into an executable simulation model.

In this example, at step 6, simulation occurs. Simulating enables kernel designs to be rapidly developed by building and testing. The simulator offers visibility into the execution of a kernel that is not available in a real FPGA implementation and, crucially, has a significantly quicker build time than for hardware output. The simulation of a design will run much more slowly than a real FPGA implementation, so hardware output can be used later in the design cycle to test with large data sets.

At step 8 it is determined if the design works via the simulation and in dependence on this determination, the hardware is built (step 10) and then integrated with host code (step 12). As mentioned above, in general this process of designing, generating and subsequently forming a programmed FPGA is known.

A problem arises in that errors or "bugs" will inevitably be present in the hardware configuration and these must be addressed. In the present method, a graph pass modification is performed in that the generated graph is modified so as to remove data path elements and leave only control elements that affect the control flow of the streaming accelerator. This significantly increases the speed and efficiency of the debugging process as will be explained in greater detail below. In the example described the graph generation is at a specific position within the general method. It will be appreciated that this position is not critical. What is important for the present method is that the design of the accelerator is modelled in a graph.

Most control flow issues result purely from bugs in the control path of the stream processor. The present method recognises that the actual data values being transferred between kernels, or between an FPGA and the host, are often irrelevant. This enables debug of the control flow without needing the full circuit, i.e. the data path can effectively be ignored.

This provides significant advantages:

1. If being debugged in hardware, the compilation time for a chip design is significantly reduced, since the data path (which is ignored) typically makes up most of the chip area.

2. If being debugged in simulation, elimination of the data path means that most of the circuit need not be simulated. When simulating on a CPU (e.g. step 6 from FIG. 2), simulation time for a single clock cycle of the chip is approximately proportional to the number of elements on the chip that need to be simulated. Therefore, by not simulating the data path, simulation time can be significantly cut. It remains slower to simulate each clock cycle than it would be to run the process in hardware, however simulating can avoid the long hardware build times which may then need redoing if bugs are discovered late in the design process.

Typically this method can be implemented within a streaming compiler such as the compilation backend for the kernel compiler part of MaxCompiler described above.

The compilation backend provides a means by which a graph representing the accelerator may be generated, which is then processed so as to simplify the debug process. It is described for example in the paper entitled "A Java-Based System for FPGA Programming", by Jacob A. Bower, James Huggett, Oliver Pell and Michael J. Flynn, published in FPGA World, Academic Proceedings of the 5th FPGA World Conference, Sep. 11, 2008, STOCKHOLM, Sweden, the entire contents of which are hereby incorporated by reference for all purposes. Kernel graphs represent both control paths and data paths of a streaming processor such as an FPGA accelerator, as a directed graph, generated from a user's input description. For example, FIG. 3 shows a user's input MovingAverageKernel program together with the corresponding graph generated.

Figure 3:
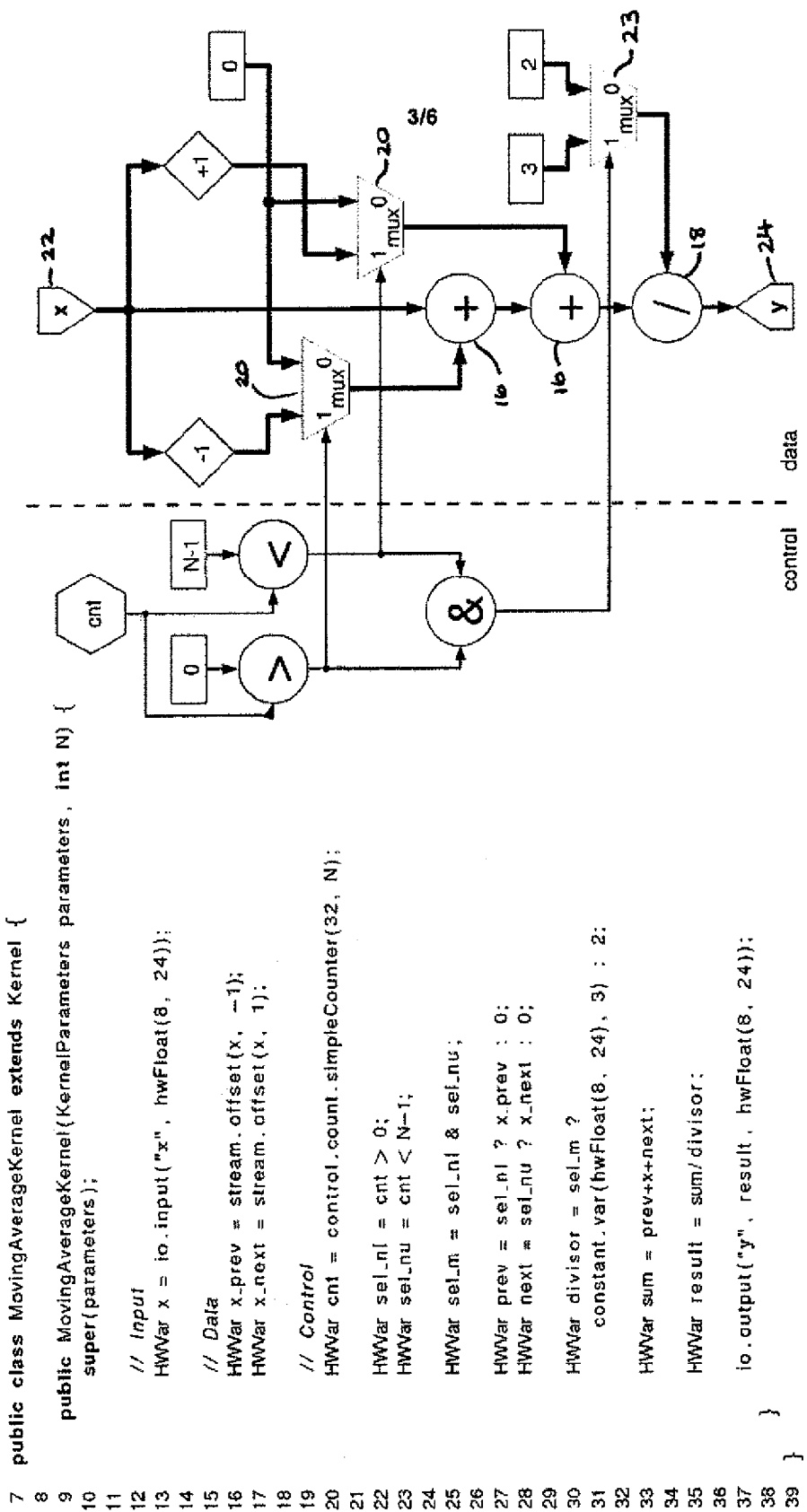
FIGS. 3 to 5 show, schematically, graphs representing kernels within hardware accelerators; and, FIG. 6 is a schematic representation of the graph of FIG. 5, modified in accordance with the method.

Referring to FIG. 3, it can be seen that the graph includes kernels for executing various arithmetical compute steps on streaming data. Typically, in accordance with the present method, nodes in such a graph can be split into three broad categories, which are as follows:

1. Data Path Nodes

Data path nodes are nodes within the graph that represent the hardware that provide the arithmetic that help to compute the required result. Referring to FIG. 3 these include the "add" nodes 16 and "divide" node 18.

2. Control Path—Internal

These nodes are control path nodes that do not affect external control. In other words, in general such nodes affect only control path within a kernel but do not affect the kernel's control flow as observed by the outside world. Referring again to FIG. 3, in this example the control path elements help to select the parts of the data path that are active in the kernel and hence what results are computed, however they do not affect how many input values are consumed or how many output values are produced or the pattern of input 'reads' or output 'writes'. Thus, as far as the "outside world" is concerned this control path is irrelevant. Indeed as can be seen, the control path in FIG. 3 provides control inputs to the multiplexers 20, but does not affect the external input 22 and output 24. By controlling the inputs to the multiplexers 20, 22 and 23, the parts of the data path that are activated are selected, but the amount of data consumed or number of output values is not affected.

3. Control Path—External

These nodes are those that interface directly with the world outside the kernel in question and/or affect the externally visible control flow of the kernel. For example, they may affect the number of input items read, the number of output items produced or when the kernel has finished its processing and can therefore stop. In the example of FIG. 3 the input x 22 and output y 24 do interface directly with the external world. A further example of a kernel will now be described with reference to FIG. 4 in which external control is affected.

When it comes to modifying the graph so as to remove data path elements that do not affect the external control flow, it is therefore only category 3 nodes or components that need to be preserved so as to ensure that external control flow remains unchanged.

Figure 4:
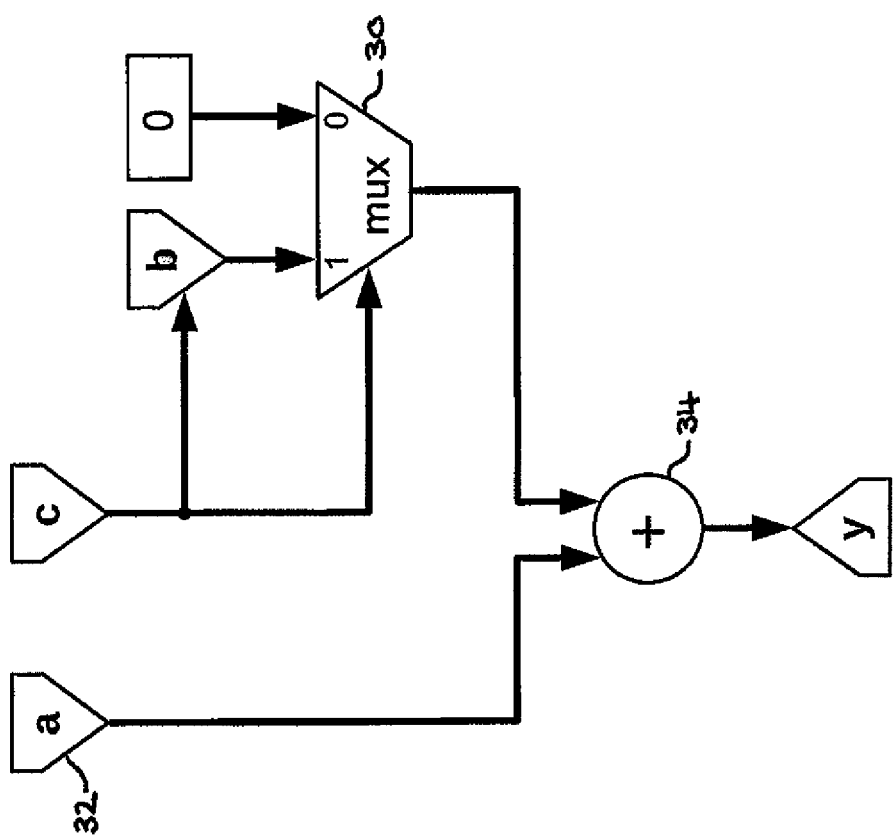

FIG. 4 shows a schematic representation of a graph representing a hardware configuration for a simple kernel. In this example, the output from a multiplexer 30 is added to an input "a" 32 at adder 34. The output "y" from the process is thus generated. In this example, the factor that influences the externally visible control flow (not the actual resultant value but rather the presence of data) is the connection from input "c" to the control/read input of input "b". When c reads 1 (and consequently presents a value 1 to b), b will read a value from the external input stream. This may come, for example, from another kernel which has provided an output.

In contrast, when c reads 0 (and consequently presents a value 0 to b), b will not read a value from the input stream. The input c and the connection from the value read to the control input of input b is therefore critical in order to preserve the externally visible control flow of the input b, i.e. to make sure it reads the expected number of values. This is because the value read and transmitted by c determines whether or not b actually reads data from an external location. Therefore, the value of c is critical to the external flow control of the system as a whole as it determines whether or not data is read from a location external (to the kernel) or not. On the other hand, the adder 34 and the multiplexer node 30 are not part of category 3 and can be removed from the graph for the purpose of debugging external flow control.

The input "a" interfaces directly with the world outside the kernel and is therefore maintained. It does not of course affect the control flow within the kernel or indeed beyond the output of a and so it does not matter what the output from a actually is. The output "y" is also maintained since it interfaces directly with the world outside the kernel.

The process by which a control path in a kernel is modelled and then debugged will now be described in detail.

First, nodes/edges within the map or graph of the hardware, that can be deleted as described above, are identified. These nodes are then removed from the graph. In one example the removed nodes or components are replaced with other components referred to as "dummy nodes". A dummy node is one which is arranged to connect the output of the respective node to zero and disconnect its input.

The graph is traversed in reverse topological order, i.e. from the outputs to the inputs. For each node it is determined whether the node is in the set that should not be removed. As explained above, these are nodes that affect the external interface of the stream processor directly. For example, these might include external outputs or inputs, scalar inputs/outputs (registers), mapped ROMs and/or RAMs.

If the node is in this set then it is ignored and the method proceeds to the next node in topological order. If the node is not in this set then it is removed. A set of nodes is built up referred to as "ControlNodes" which includes all nodes that are not to be removed from the graph. Nodes in this first set may be considered direct control path nodes.

Next for any of the direct control path nodes, a check is made as to whether or not the outputs from the node is connected to any of 1. control inputs of a node that propagate external control flow. For example, input read control, output write control, finish/pipeline flush control.
2. an input to a node that is in the set "ControlNodes".

If either of these conditions is satisfied then the node may be considered an indirect control path node and it is added to the set ControlNodes. As an example, consider the multiplexer 30 in FIG. 4. This receives an input from the input terminal b but does not propagate any external control flow. It merely propagates data in the form of an input to the adder 34. In addition it does not have an output to any ControlNode. Thus, this multiplexer 30 can be removed from the graph of FIG. 4.

If a node is not of the type first identified (those that directly affect the external interface), nor in the second set (indirect control path node) connected to such a node, then it is removed from the graph. Thus, in accordance with a characteristic of the node relating to its external connectivity it is either maintained or removed from the graph representing the process to be implemented in the FPGA. As already mentioned it can be removed by deleting it or by replacing it with a dummy node which connects the output to zero and disconnects the input. The process is preferably performed on each kernel in the manager.

Once this has been completed and all the nodes that can be removed have been removed a compilation of the hardware is performed as would normally be done. However, the nodes that are "only" data path elements are removed. Circuits that do not contain the data path can be compiled more quickly leading to shorter development cycles for FPGA devices and the like. In the present method by identifying nodes in the manner described, and classifying them accordingly, the problem of intermingled control and data paths is addressed enabling simplified and more efficient debugging. For example, when running in hardware, the programmable logic area freed by eliminating the datapath can be used to add additional debugging logic to the chip providing better visibility into the running chip than is normally possible. When the program has been compiled having been subjected to the graph pass modification, control path bugs can be identified and addressed as required. Indeed, it will be known that any bugs identified at this stage relate to control path and not to data path.

Figure 5:
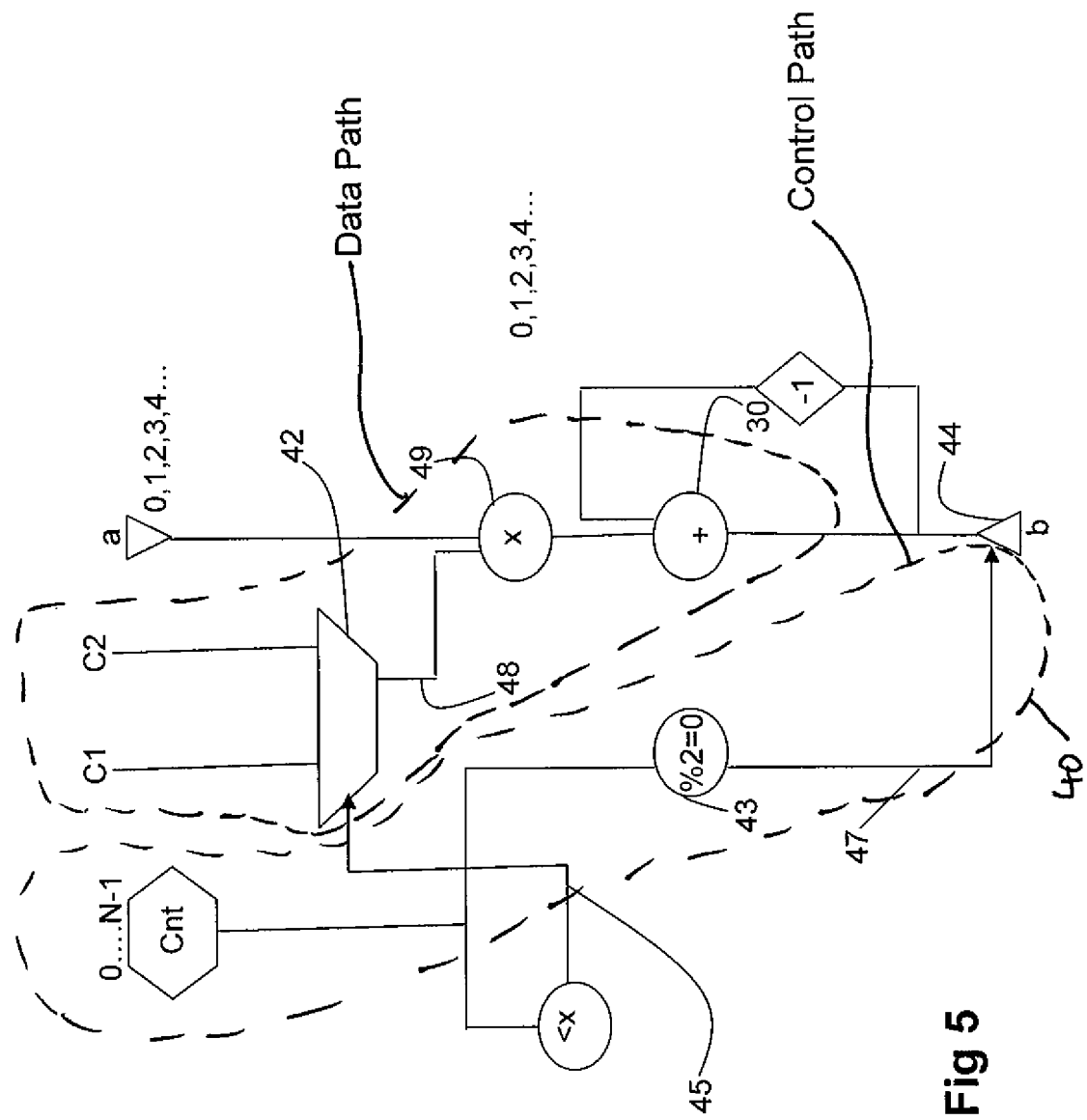

FIG. 5 shows a more detailed example of a graph representing an FPGA kernel or FPGA design to be tested. In this example the control path is made up of the components identified in combination as 40 that serve to control which data is operated on and when within the compute cycle. The data path is relatively simple and will perform the multiplication of two variables in multiplier 49, one selected by multiplexer 42, and adding two variables in adder 30. A counter Cnt provides an output to a decision making unit 43 that determines if the counter value is even or not. If it is, then the control input to output b is true (or 1) and so a value is output. If it is not then the control input to output b is false (or 0) and so no output will be generated. The adder 30 adds the previous value of input a to the current value of a multiplied by some constant (C1 or C2). The output 'b' emits an output value only when triggered to do so by receiving a '1' on the control input 47.

The control inputs are provided by the control path at multiplexer 42 and output 44. The signal 47 at output 44 affects the external flow control of the kernel made up of the data path 46. As above with reference to FIG. 3, the control signal 45 provided to multiplexer 42 determines which value, C1 or C2, is output from the multiplexer. Similarly, the signal 47 provided to the output 44 determines whether or not for each level of Cnt an output is provided from b within the kernel. Therefore, this control signal 47 is part of the external control path. In contrast, the signal 48 that is output from the multiplexer 42 to the multiplier 49 does not affect the external control path and thus the node 49 can be ignored when debugging the control path. It will be appreciated that the inputs a and b are also maintained as they represent external inputs and outputs from the kernel.

In one example, a data value output of one kernel may influence the external control flow of a different kernel to which it is connected. In this case it may be classified as a control node for the whole chip (though not for this one kernel in isolation). Accordingly, in a preferred embodiment, such "chip-wide" control nodes can be identified after initially control path nodes have been identified on a kernel-wide basis as described above.

Figure 6:
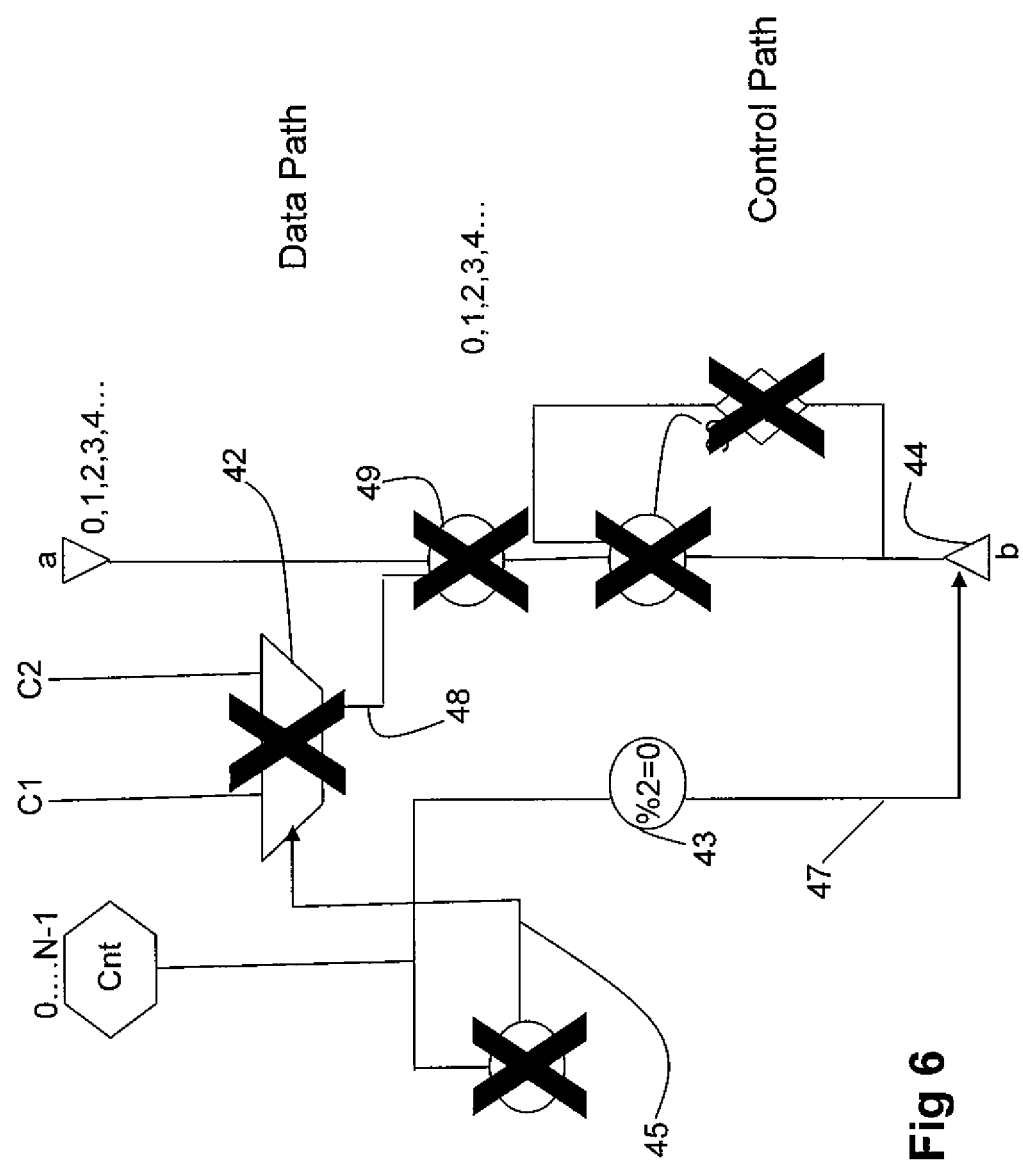

FIG. 6 is a schematic representation of the graph of FIG. 5, modified in accordance with the present method. As can be seen the components in the graph that do not affect external flow control have been removed. This simplified graph is easier and quicker to simulate enabling debugging to be correspondingly simplified and accelerated. In the example shown it can be seen that data path elements such as the multiplexer 42, adder 30 and multiplier 49 have been removed, whereas control path elements have been maintained. Furthermore, externally facing elements such as the input a and output b are maintained. Input a, although not having an output that affects the control flow, does interface directly with the external world and is thus maintained. The same goes for output b.

Once the hardware accelerator has been designed and debugged it is provided in a computer system that typically includes a host processor, memory and means for communicating between the various components. The computer system may have the form of the system shown in FIG. 1 except the accelerator is designed and debugged according to the present method.

Embodiments of the invention have been described with particular reference to the examples illustrated. However, it will be appreciated that variations and modifications may be made to the examples described within the scope of the invention.

The invention claimed is:

1. A method of generating a stream processor, the method comprising:
    generating a graph of nodes representing the stream processor to be implemented in hardware;
    identifying nodes within the graph that affect external flow control of the stream processor;
    retaining the identified nodes and removing or replacing all nodes that do not affect external flow control of the stream processor in a modified graph;
    simulating, by a processor, the modified graph or building a corresponding circuit of the retained nodes;
    traversing the graph in reverse order from outputs to inputs and, for each node, determining in sequence if it affects external flow control; and
    once the graph has been simulated or a corresponding circuit built of nodes that do affect external flow control, debugging any identified flow control bugs independent of the data flow through the stream processor.

2. The method according to claim 1, wherein the determination as to whether or not the node affects external flow control includes identifying it if it is a control signal to one or more inputs or outputs.

3. The method according to claim 2, comprising categorizing each node into a class selected from the following:
    a. data path nodes comprising the processing to be performed on data streaming through the stream processor;
    b. control path nodes comprising nodes that affect control within the graph; and
    c. control path nodes that affect external flow to or from the graph.

4. The method according to claim 1, comprising categorizing each node into a class selected from the following:
    a. data path nodes comprising the processing to be performed on data streaming through the stream processor;
    b. control path nodes comprising nodes that affect control within the graph; and
    c. control path nodes that affect external flow to or from the graph.

5. The method according to claim 4, in which nodes in classes a and b are removed from the graph.

6. The method according to claim 1 further comprising automatically generating the graph of nodes from a high level description of the stream processor to be implemented.

* * * * *